(12) United States Patent
Robertson et al.

(10) Patent No.: US 10,227,753 B2
(45) Date of Patent: Mar. 12, 2019

(54) DYNAMIC MOTION OPTIMIZATION FOR EXCAVATING MACHINES

(71) Applicant: Siemens Industry, Inc., Alpharetta, GA (US)

(72) Inventors: Daniel W. Robertson, Cumming, GA (US); Julian D. Jaeger, Atlanta, GA (US); Gopalakrishnan Madhavarao, Alpharetta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 3 days.

(21) Appl. No.: 15/310,457

(22) PCT Filed: Jun. 24, 2015

(86) PCT No.: PCT/US2015/037404
§ 371 (c)(1),
(2) Date: Nov. 11, 2016

(87) PCT Pub. No.: WO2015/200475
PCT Pub. Date: Dec. 30, 2015

(65) Prior Publication Data
US 2017/0107692 A1    Apr. 20, 2017

Related U.S. Application Data

(60) Provisional application No. 62/016,856, filed on Jun. 25, 2014.

(51) Int. Cl.
*E02F 3/30* (2006.01)
*E02F 3/48* (2006.01)
(Continued)

(52) U.S. Cl.
CPC ........... *E02F 9/123* (2013.01); *B60L 11/00* (2013.01); *E02F 3/48* (2013.01); *E02F 9/2033* (2013.01);
(Continued)

(58) Field of Classification Search
USPC ........................................... 701/22
See application file for complete search history.

(56) References Cited

U.S. PATENT DOCUMENTS

2007/0150149 A1* 6/2007 Peterson ............. E02F 3/437
701/50
2008/0282583 A1  11/2008 Koellner et al.
(Continued)

FOREIGN PATENT DOCUMENTS

CN  102817390 A  12/2012
CN  103141090 A   6/2013
(Continued)

OTHER PUBLICATIONS

JP,61-053922,A translation to Haga et al.*
(Continued)

*Primary Examiner* — Jean Paul Cass

(57) ABSTRACT

A system for an excavating machine comprises a control system operating aspects of the excavation machine; and a monitoring system receiving inputs from one or more sensors determining if the excavating machine is in a first state or a second state. In operation, if the excavating machine is in the first state, then the control system enables the excavating machine to perform a first action; or if the excavating machine is in the second state, then the control system disable the excavating machine to perform the first action.

12 Claims, 4 Drawing Sheets

(51) Int. Cl.
*E02F 9/12* (2006.01)
*E02F 9/20* (2006.01)
*E02F 9/26* (2006.01)
*B60L 11/00* (2006.01)

(52) U.S. Cl.
CPC ........... *E02F 9/265* (2013.01); *B60L 2200/40* (2013.01); *E02F 3/308* (2013.01)

(56) References Cited

U.S. PATENT DOCUMENTS

| | | | |
|---|---|---|---|
| 2012/0236566 A1 | 10/2012 | Taylor et al. | |
| 2012/0263566 A1* | 10/2012 | Taylor | E02F 3/437 414/694 |
| 2012/0277959 A1* | 11/2012 | Colwell | E02F 3/46 701/50 |
| 2013/0182066 A1 | 7/2013 | Ishimoto | |
| 2013/0261885 A1* | 10/2013 | Hargrave, Jr. | E02F 9/262 701/34.4 |

FOREIGN PATENT DOCUMENTS

| | | |
|---|---|---|
| CN | 103243772 A | 8/2013 |
| CN | 103362172 A | 10/2013 |
| CN | 103502541 A | 1/2014 |
| EP | 2716821 A1 | 4/2014 |
| JP | S6153922 A | 3/1986 |
| JP | H10140615 A | 5/1998 |
| SU | 777157 A1 | 11/1980 |
| SU | 874893 A1 | 10/1981 |
| WO | 2012161062 A1 | 11/2012 |

OTHER PUBLICATIONS

EP2716821A1 translation to Wu.*
PCT International Search Report and Written Opinion dated Dec. 8, 2015 corresponding to PCT Application PCT/US2015/037404 filed Jun. 24, 2015. (17 pages).

* cited by examiner

DYNAMIC MOTION OPTIMIZATION FOR EXCAVATING MACHINES

CROSS REFERENCE TO RELATED APPLICATIONS

This application is the U.S. National Stage of International Application No. PCT/US2015/037404 filed 24 Jun. 2015 and claims benefit thereof, the entire content of which is hereby incorporated herein by reference. The International Application claims benefit under 35 U.S.C. § 119(e) of U.S. Provisional Patent Application No. 62/016,856, filed 25 Jun. 2014, the entire contents and substance of which is hereby incorporated by reference as if fully set forth herein.

BACKGROUND

1. Field

Aspects of the present invention relate to excavating machines and, more particularly, to dynamic motion optimization for excavating machines.

2. Description of Related Art

In general, excavating machines are large and expensive machines that are used to excavate large quantities of overburden and minerals. These excavating machines often include multiple motors controlling the operation of the various components of the excavating machine. In order to operate, excavating machine operators use a set of controls to simultaneously operate the multiple motors. Due to the size of the excavating machines and the complexity of the operation, the operators must be highly trained to properly and safely operate the excavating machines.

Despite extensive training, operators routinely make errors in the operation of the excavating machines, which can cause damage to the excavating machine and lead to down-time of the excavating machine and increased cycle time. The proficiency with which the operator can operate the excavating machine contributes significantly to the productivity of the excavating machine.

SUMMARY

Aspects of the present invention relate to a dynamic motion optimization algorithm for an excavating machine that can reduce the likelihood that an operator error can cause damage to the excavating machine and lead to down-time of the excavating machine and increased cycle time.

In exemplary embodiments, a control system of a excavating machine is configured to prevent a swing operation while the excavating machine is engaged in the digging motion, configured to limit crowd speed based on crowd angle, configured to limit hoist speed based on load in a dipper, and/or configured to prevent the excavating machine from stalling while excavating.

DETAILED DESCRIPTION

To facilitate an understanding of embodiments, principles, and features of the present invention, they are explained hereinafter with reference to implementation in illustrative embodiments. In particular, they are described in the context of systems and methods for dynamic motion optimization for excavating machines.

Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Although the systems and methods that may be described herein may be directed to either a dragline excavating machine or an electric rope shovel machine, the technology described, including the systems and methods herein, can also be provided, used, operated and/or implemented in various other excavating machines.

Figure 1:
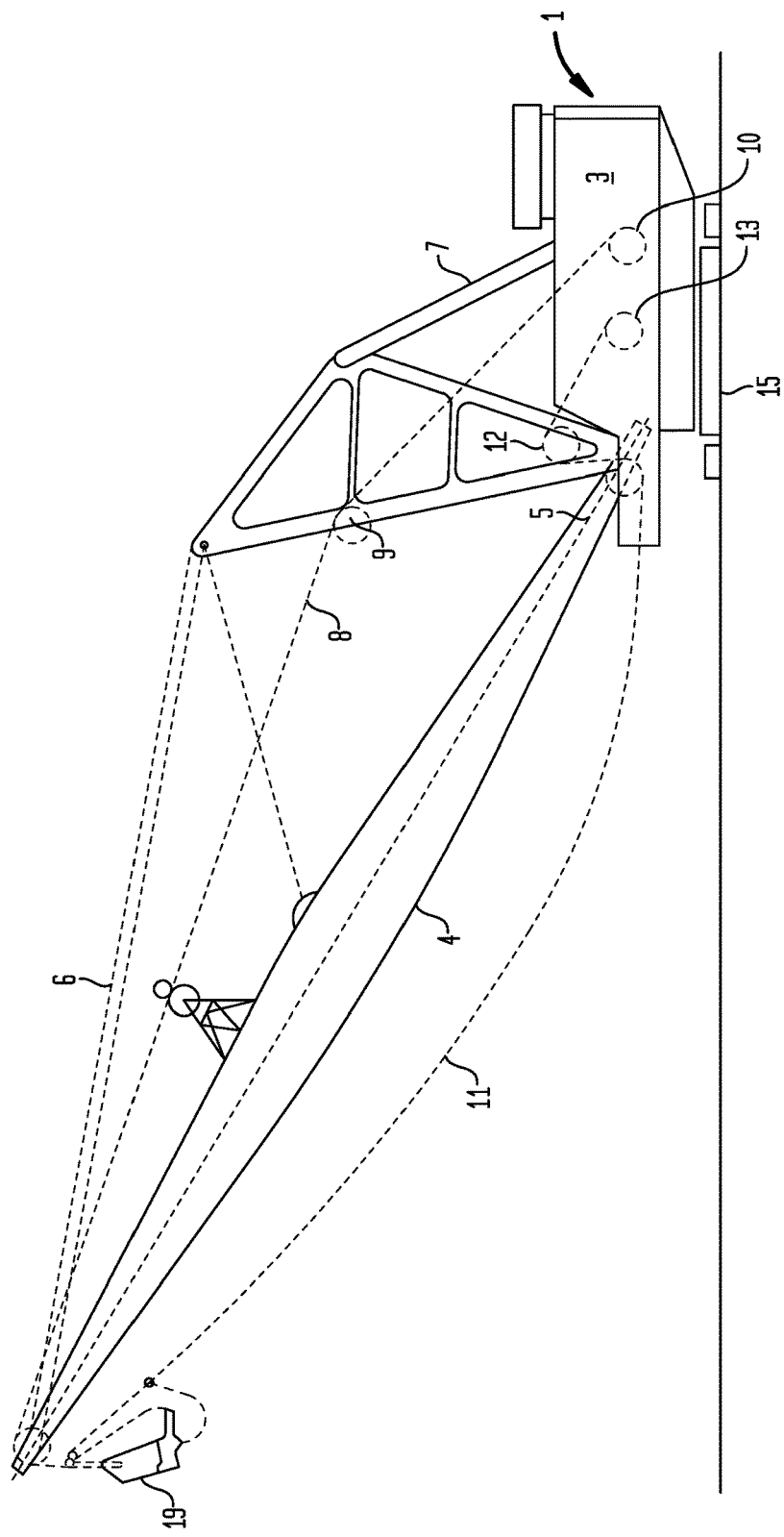
FIG. 1 is a perspective view of an excavating machine, i.e., a dragline machine, in accordance with an exemplary embodiment of the present invention.

Referring now to FIG. 1, a portion of an excavating machine 1, here a dragline excavating machine, is illustrated. The dragline excavating machine 1 includes a base, which rests upon the ground and supports a machinery house 3. The machinery house 3 carries a boom 4 projecting upwardly from the lower front of the house 3. The boom 4 includes a foot, which is connected to the house by a connection member, for example and not limitation foot pins 5. In exemplary embodiments, the boom 4 is held at the desired angle of inclination by means of suspension cables 6 extending from the boom 4 to an A-frame 7 carried on top of the house 3. An excavating member, for example bucket 19, is suspended by hoist ropes 8, which pass over sheaves 9 on the mast to wind on hoist drums 10 in the house.

During operation, the bucket 19 can be moved toward the dragline excavating machine 1 by drag ropes 11 passing over fairleads 12 near the boom foot pins 5 and onto drag drums 13 in the machinery house 3. The dragline excavating machine 1 may be mounted on a walking mechanism 15, which allows the dragline excavating machine 1 to be moved from one location to another. The walking mechanism 15 includes a shoe that is driven internally by drive systems including an internal motor and gear assembly, in a conventional manner.

Dragline excavating machines are primarily used to dig below their working level and to dump at an elevated level. The digging cycle consists of five components: (1) drag to fill, (2) hoist and swing to dump, (3) dump, (4) lower and return swing, and (5) position bucket.

The dragline cycle begins with the bucket lowered in a pit and positioned to penetrate the bank. Dragging it into the face fills the bucket. Once filled, hoisting and drag pay out commences almost immediately, followed by swinging as the bucket clears the trench. As the bucket swings and climbs, proper tension between the hoist and drag controls holds the bucket in the carry position. As the dumping location is approached, the swing control is reversed to stop swinging and the drag is allowed to pay out until the bucket is tilted and dumps its load. Due to the swing inertia of the machine, the direction of swing will not change for several seconds after the controls are reversed, giving the bucket time to dump without delay. During the return swing, the hoist is lowered and the drag is reeved in so as to begin the positioning of the bucket for the next load. The swing control is reversed to stop the swing motion, and then neutralized as the bucket settles into position. The proficiency with which these functions are carried out contributes significantly to the productivity of the machine.

Figure 2:
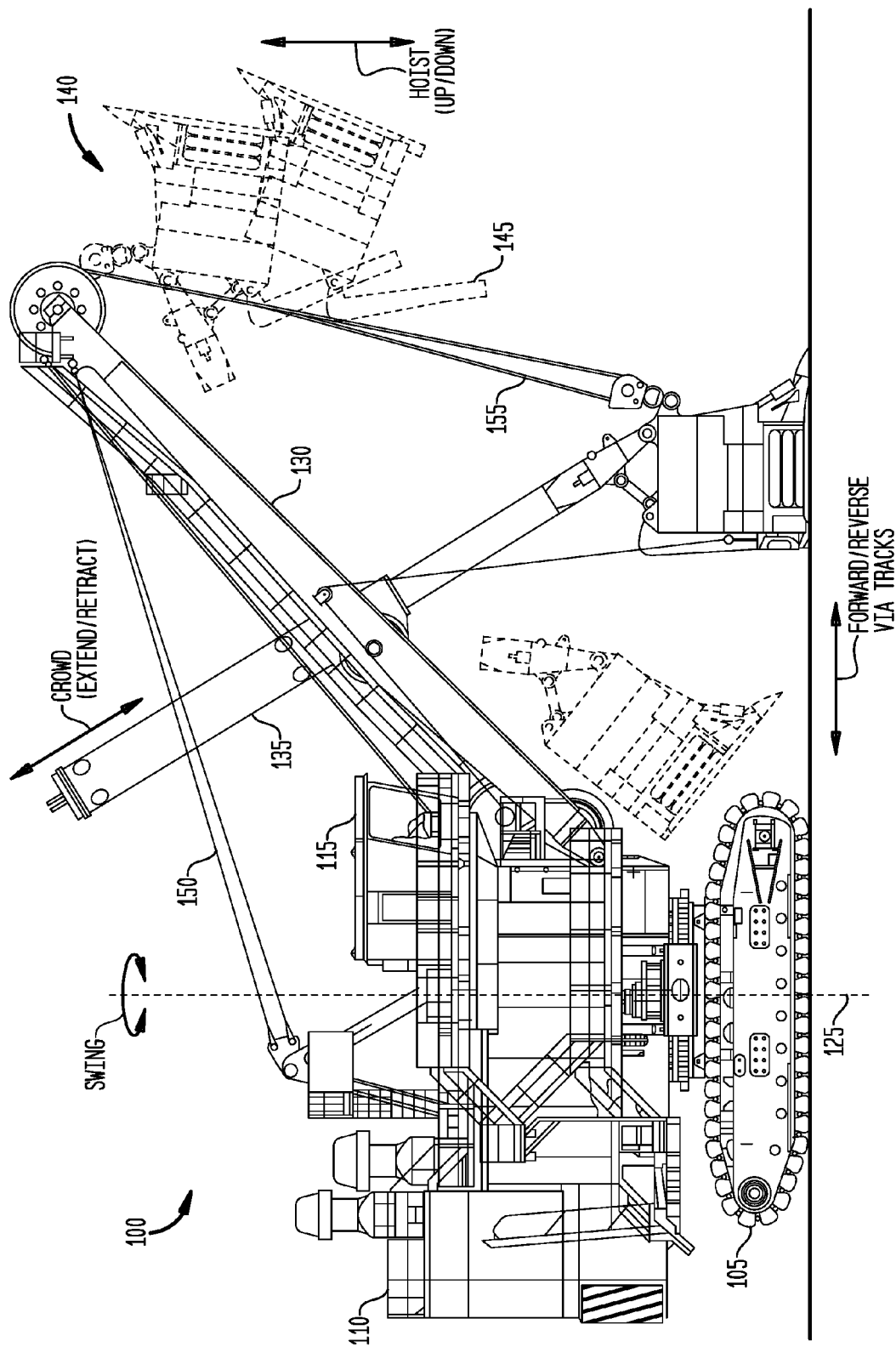
FIG. 2 is a perspective view of another excavating machine, i.e., an electric rope shovel machine, in accordance with an exemplary embodiment of the present invention.

FIG. 2 depicts another excavating machine, i.e., an electric rope shovel machine 100. The electric rope shovel machine 100 includes tracks 105 for propelling the electric rope shovel machine 100 forward and backward, and for turning the electric rope shovel machine 100 (e.g., by varying the speed and/or direction of the left and right tracks relative to each other). The electric rope shovel machine 100 includes a machine house 110 and a cab 115. The machine house 110 is able to swing or swivel about a swing axis 125, for instance, to move from a digging location to a dumping location. The electric rope shovel machine 100 also includes a handle 135 supporting an excavating member, in this case a bucket or dipper 140. The dipper 140 includes a door 145 for dumping contents within the dipper 140. The electric rope shovel machine 100 also includes suspension cables 150 coupled between the machine house 110 and boom 130 for supporting the boom 130; a hoist cable 155 attached to a drum within the machine house 110 for winding the cable 155 to raise and lower the dipper 140; and a crowd motor for extending and retracting the handle 135.

When the tracks 105 of the electric rope shovel 100 are static, the dipper 140 is operable to move based on three control actions: (1) hoist, (2) crowd, and (3) swing.

As noted above, the hoist control raises and lowers the dipper 140 by winding and unwinding hoist cable 155. In exemplary embodiments, the hoist cable 155 is wound on a large drum driven by an AC motor, is routed through sheaves (pulleys), and supports the bucket assembly from the boom 130. The crowd control extends and retracts the position of the handle 135 and dipper 140. The swing control rotates the machine house 110 relative to the swing axis 125 (see, e.g., FIGS. 3A-C). By skillful maneuvering of the hoist cables and the crowd handle assembly, the bucket is controlled for filling with overburden/minerals and dumping on a haul truck for excavation purposes. Before dumping its contents, the dipper 140 is maneuvered to the appropriate hoist, crowd, and swing position to 1) ensure the contents do not miss the dump location 170; 2) the door 145 does not hit the dump location 170 when released; and 3) the dipper 140 is not too high such that the released contents would damage the dump location 170 or cause other undesirable results.

Figure 3A:
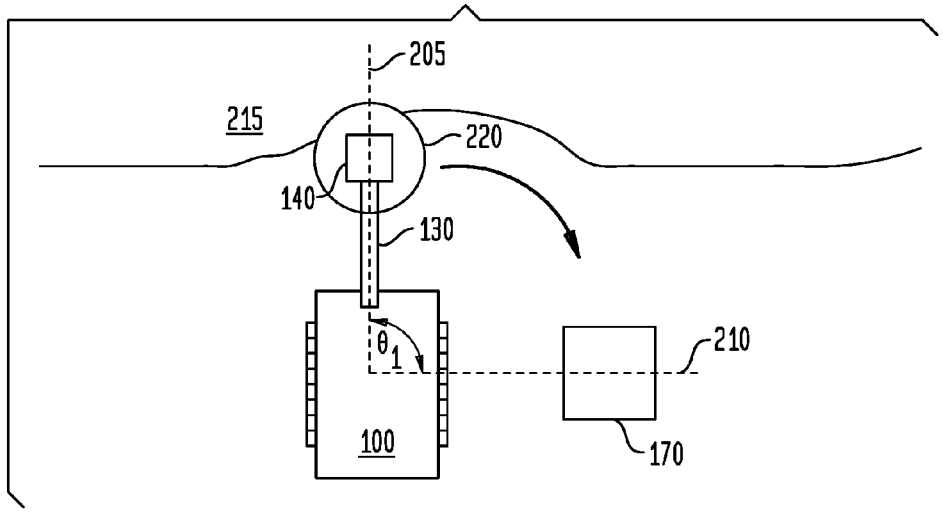
FIGS. 3A, 3B and 3C depict a swing cycle of the excavating machine between a dig location and a dumping location, in accordance with exemplary embodiments of the present invention.
Figure 3B:
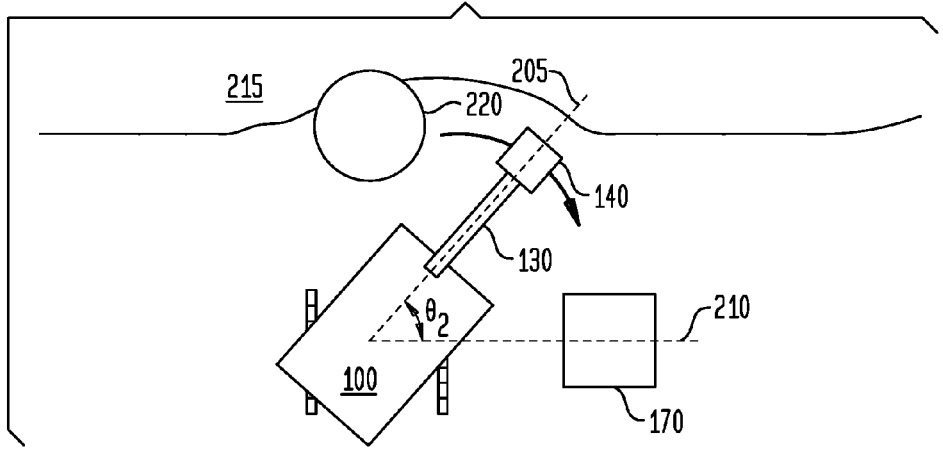
Figure 3C:
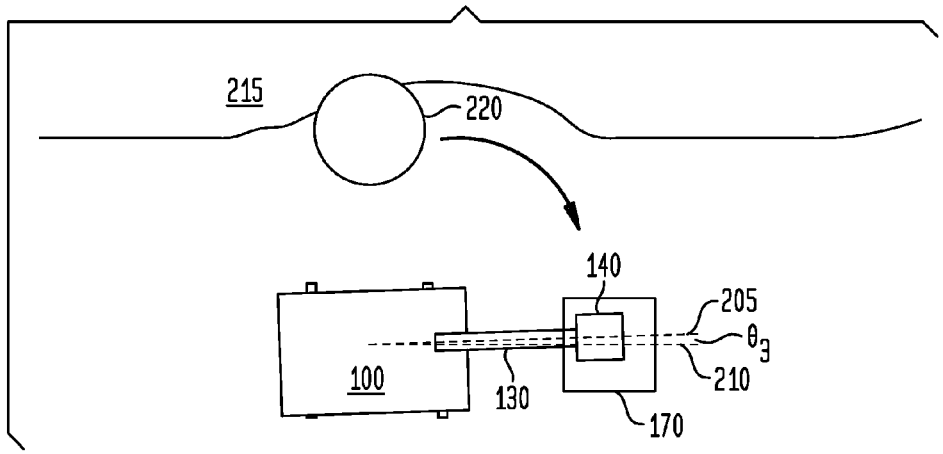

FIGS. 3A-3C depict exemplary swing angles of the electric rope shovel machine 100 moving from a dig position to a dump position. For reference purposes, a boom axis 205 and dump position axis 210 are overlaid on FIGS. 3A-3C, with the swing axis 125 being the approximate intersection of the boom axis 205 and dump position axis 210. The angle between the handle axis 205 and the dump position axis 210 is referred to as $\theta$. In FIG. 3A, the dipper 140 digs into bank 215 at a dig location 220, and $\theta=\theta_1$. After digging, the electric rope shovel 100 begins to swing the boom 130 towards the dump location 170. In FIG. 3B, the boom 130 is about mid-way through the swing-to-dump, and $\theta=\theta_2$. In FIG. 3C, the boom 130 has stopped over the dump location 170 and the door 145 is released to dump the materials within the dipper 140 into the dump location 170, with $\theta=\theta_3$.

Figure 4:
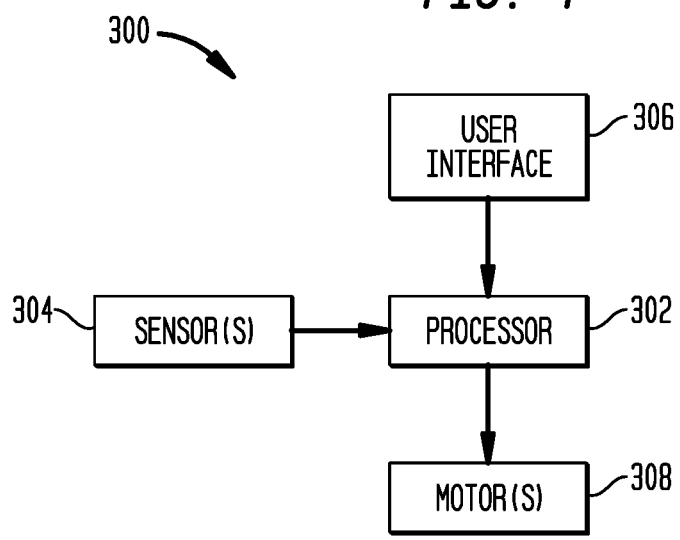
FIG. 4 is a block diagram of a control system for the excavating machine, in accordance with an exemplary embodiment of the present invention.

Referring now to FIG. 4, a block diagram of a control system 300 for an electric rope shovel machine in accordance with an exemplary embodiment is shown. As illustrated the control system 300 includes a processor 302, one or more sensors 304, a user interface 306, and one or more motors 308. In exemplary embodiments, the processor 302 receives input signals from both the user interface 306 and the one or more sensors 304, and responsively controls the operation of the one or more motors 308.

In exemplary embodiments, the processor 302 may be a digital signal processing (DSP) circuit, a field-programmable gate array (FPGA), an application specific integrated circuits (ASICs) or the like. The processor 214 can be many custom made or commercially available processors, a central processing unit (CPU), an auxiliary processor among several processors, a semiconductor based microprocessor (in the form of a microchip or chip set), or generally any device for executing instructions. The processor 302 may include a memory and a transceiver. The processor 302 may communicate with the plurality of sensors 304 wirelessly or via wired connections.

The one or more sensors 304 may include a wide variety of sensors disposed in various locations carried by the electric rope shovel machine and are used to monitor a wide variety of operating conditions of the electric rope shovel machine. The operating conditions of the electric rope shovel machine include, but are not limited to, the position of the handle, the position of the dipper, the weight of the material in the dipper, the torque on the handle, the swing position, the crowd speed, the hoist speed, a crowd angle, and the like. In exemplary embodiments, the processor 302 monitors the reading received from the one or more sensors 304 and can actively limit the operation of the one or more motors 308.

For example, with the dipper empty the maximum lower speed may be set to a first level and, with the dipper having over a threshold load, the maximum lower speed may be set to a second level that is lower than the first level. In such cases, processor 302 may determine the load in the dipper based on the readings from the one or more sensors 304 and the processor 302 may limit the maximum lower speed. That is, if the operator, via the user interface 308, attempts to lower at maximum velocity the processor 302 may limit the maximum velocity based on the detected load.

In exemplary embodiments, the control system 300 of the electric rope shovel machine is configured to prevent a swing operation while the electric rope shovel machine is excavating, as shown in FIG. 3A. Preventing a swing operation of an excavating machine while the excavating machine is actively digging can prevent damage to the excavating machine. In exemplary embodiments, the processor 302 monitors the input signals received from the one or more sensors 304 and responsively determines if the dipper is engaged with a bank. Based on making the determination that the dipper is engaged with a bank, the processor 302 may set a dipper engaged condition or flag. In exemplary embodiments, upon the processor 302 receiving a swing command from the operator, for example via the user interface 308, the processor 302 will check to see if the dipper engaged condition or flag indicates that the dipper is currently engaged with a bank. If the dipper is not currently engaged with a bank, the processor 302 will proceed to execute the swing command received. But if the dipper is currently engaged with a bank, the processor 302 will not execute the swing command. In exemplary embodiments, the processor 302 may be configured to provide a command over-ride alert in response to not executing a received swing command. The command over-ride alert may be displayed to the operator of the electric rope shovel machine to alert the operator that their command was overridden. In addition, the command over-ride alert may be logged and stored in the memory of the processor 302, or it may be transmitted by the processor 302 to a separate piece of equipment.

In exemplary embodiments, for example with a loaded dipper, the control system 300 of the electric rope shovel machine is configured to limit the crowd speed based on the crowd angle. As used herein, the term "crowd speed" means the speed at which the handle 135 is extended or retracted as shown in FIG. 2. As used herein the term "crowd angle" means the angle of the handle 135, as shown in FIG. 2, relative to a vertical position. For example, the crowd angle of the handle 135 shown in FIG. 2 is about 95°; a crowd angle of 0° would indicate that the handle 135 was perpendicular with the ground. In exemplary embodiments, the handle is extended and retracted by an AC motor and the speed of the extraction and retraction, the crowd speed, is controlled by an operator via a user interface. In exemplary embodiments, the AC motor used to control the operation of the handle may not be capable of stopping the movement of the handle if the handle is moving at a crowd speed when the crowd angle is low due to the weight of the handle and the dipper.

Accordingly, the control system 300 of the electric rope shovel machine is configured to limit the crowd speed based on the crowd angle. In exemplary embodiments, the processor 302 monitors one or more input signals received from the one or more sensors 304 and responsively calculates the crowd angle. In exemplary embodiments, the processor 302 limits the maximum crowd speed as a function of the calculated crowd angle. For example, as the crowd angle decreases the maximum crowd speed allowed by the processor 302 also decreases. In exemplary embodiments, by limiting the maximum crowd speed based on the crowd angle the processor 302 ensures that the control system 300 is capable of stopping the movement of the handle, which will help prevent damage to the dipper and the handle of the electric rope shovel machine.

In exemplary embodiments, the control system 300 of the electric rope shovel machine is configured to limit the hoist speed based on the load in the dipper. As used herein, the term "hoist speed" means the speed at which the dipper 140 is raised or lowered, for example, as shown in FIG. 2. In exemplary embodiments, the dipper 140 is raised and lowered by an AC motor and the hoist speed is controlled by an operator via a user interface. In exemplary embodiments, the AC motor used to control the hoist speed may not be capable of stopping a lowering movement of the dipper 140 if the dipper 140 is moving at a high hoist speed depending on the load in the dipper 140.

In exemplary embodiments, the processor 302 monitors the input signals received from the one or more sensors 304 and responsively calculates a load in the dipper. In exemplary embodiments, the processor 302 limits the maximum lowering hoist speed as a function of the load in the dipper. For example, as the load in the dipper increases the maximum lowering hoist speed allowed by the processor 302 decreases. In exemplary embodiments, by limiting the maximum lowering hoist speed based on the load in the dipper the processor 302 ensures that the control system 300 is capable of stopping the movement of the dipper 140, which will help prevent damage to the electric rope shovel machine.

In exemplary embodiments, the control system 300 of the electric rope shovel machine is configured to prevent the excavating machine from stalling while the excavating machine is excavating. The electric rope shovel machine may stall during operation for a variety of reasons. One of the most common conditions that can cause a stall is if the operator places the dipper too deep into the bank. In other words, if the operator attempts to excavate too much material in a single operation with the dipper. In general, preventing the electric rope shovel machine from stalling while the electric rope shovel machine is actively digging will decrease the cycle time of the electric rope shovel machine and thereby increasing the efficiency of the electric rope shovel machine.

In exemplary embodiments, the processor 302 monitors the input signals received from the one or more sensors 304 and responsively determines if the electric rope shovel machine is about to stall. In exemplary embodiments, the one or more input signals may include, but are not limited to, a voltage level of one or more AC motor of the electric rope shovel machine, a torque on the handle of the electric rope shovel machine, a tension in the hoist cable of the electric rope shovel machine, or the like. In exemplary embodiments, the processor 302 of the control system 300 continuously calculates a percentage chance that the electric rope shovel machine will stall based on the input signals received from the one or more sensors 304. The processor 302 includes a stall threshold value that is compared to the calculated percentage and when the calculated percentage exceeds the stall threshold value the processor may set a flag indicating that a stall of the electric rope shovel machine is likely.

In exemplary embodiments, based on the processor 302 setting a flag indicating that a stall of the electric rope shovel machine is likely, the control system 302 may make automatic adjustments to the operation of the electric rope shovel machine and may also provide a stall condition over-ride alert to an operator of the electric rope shovel machine. In one embodiment, the automatic adjustment to the operation of the electric rope shovel machine includes issuing a command to the AC motor controlling the handle to retract by a given distance. By retracting the handle, the amount of material that the dipper is removing from the bank is decreased and the chances of a stall occurring can be reduced.

In exemplary embodiments, the control system 300 monitors the operation of the electric rope shovel machine and makes automatic adjustments to the operation of the electric rope shovel machine when the likelihood that a stall may occur exceeds a threshold level. Accordingly, the control system 300 reduces the likelihood that the electric rope shovel machine will experience a stall during operation and thereby increases the efficiency of the electric rope shovel machine.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The components and materials described hereinafter as making up the various embodiments are intended to be illustrative and not restrictive. Many suitable components and materials that would perform the same or a similar function as the materials described herein are intended to be embraced within the scope of embodiments of the present invention. While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for an excavating machine comprising:
    a control system controlling the excavating machine including limiting a crowd speed based on a crowd angle; and
    a monitoring system receiving inputs from one or more sensors carried by the excavating machine,
    wherein the monitoring system determines a state of the excavating machine,
    wherein, in operation, the control system enables the excavating machine to perform an action based on the state, and
    wherein a processor of the control system receives input signals from at least one sensor and calculates a crowd angle and limits a maximum crowd speed as a function of a calculated crowd angle, such that when the crowd angle decreases, the maximum crowd speed allowed by the processor also decreases,
    wherein controlling the excavating machine includes limiting speed at which a handle of the machine is extended or retracted based on the angle of the handle relative to an approximate vertical position,
    wherein the handle is extended and retracted by an AC motor and the speed of the extraction and retraction is controllable by an operator via a user interface of the control system,
    wherein controlling the excavating machine includes preventing the machine from stalling while in the operation of excavating, and
    wherein the control system further comprises a processing system and at least one sensor, and the processing system monitors one or more input signals received from the at least one sensor and determines if the machine is about to stall, wherein the input signals from the at least one sensor comprise a voltage level of a motor of the machine, a torque on a handle of the machine, a tension in a hoist cable of the machine.

2. The system of claim 1, wherein controlling the excavating machine includes preventing a swing operation while the machine is excavating.

3. The system of claim 1, wherein the state relates to the machine actively digging and the action is preventing the machine from swinging.

4. The system of claim 1, wherein the state relates to the machine actively digging and the action is preventing a boom or arm of the machine from swinging.

5. The system of claim 1, wherein the state relates to the machine actively digging and the action is preventing a walking mechanism of the machine from moving.

6. The system of claim 1, wherein the control system further comprises a processing system and at least one sensor the at least one sensor sensing whether a dipper is engaged into a bank.

7. The system of claim 1, wherein the AC motor controls the operation of the handle.

8. The system of claim 1, wherein controlling the excavating machine includes limiting hoist speed of the machine.

9. The system of claim 8, wherein the control system further comprises a processing system and at least one sensor, wherein the processing system monitors one or more input signals received from the at least one sensor and calculates the hoist speed and a load in an excavating member of the machine.

10. The system of claim 9, the processing system of the control system limiting a maximum lowering hoist speed as a function of the load in the excavating member.

11. The system of claim 9, the processing system of the control system limiting a maximum raising hoist speed as a function of the load in the excavating member.

12. The system of claim 1, wherein the control system further comprises a processing system and at least one sensor, and the processing system monitors one or more input signals received from the at least one sensor and determines if the machine is about to stall.

* * * * *